July 29, 1947. C. E. HERMO ET AL 2,424,824
VEHICLE-MOUNTED DISTILLATION APPARATUS FOR PEPPERMINT HAY
Filed Feb. 7, 1944 3 Sheets-Sheet 3

INVENTORS
CARL E. HERMO
WM. H. HAUPERT
ATTORNEY

UNITED STATES PATENT OFFICE 2,424,824

VEHICLE-MOUNTED DISTILLATION APPARATUS FOR PEPPERMINT HAY

Carl E. Hermo, Quincy, and William H. Haupert, Portland, Oreg.

Application February 7, 1944, Serial No. 521,362

1 Claim. (Cl. 202—83)

This invention relates generally to the extraction of peppermint oil and particularly to an apparatus for processing peppermint hay.

The main object of this invention is to construct an apparatus by which peppermint oil can be extracted from peppermint hay.

The second object is to construct an apparatus by means of which peppermint hay can be processed with a minimum amount of labor and wastage.

The third object is to construct an apparatus by means of which the usual processing vats are eliminated and the extracting is performed on the hay carriers thereby eliminating the labor of unloading hay from the vehicle into the vat and the reloading of the processed hay on to the vat, as well as to save a substantial amount of time in the operation.

These and other objects are accomplished in the manner set forth in the following specification and as illustrated in the drawing in which.

Similar numbers of reference refer to similar parts throughout the several views.

Figure 1:
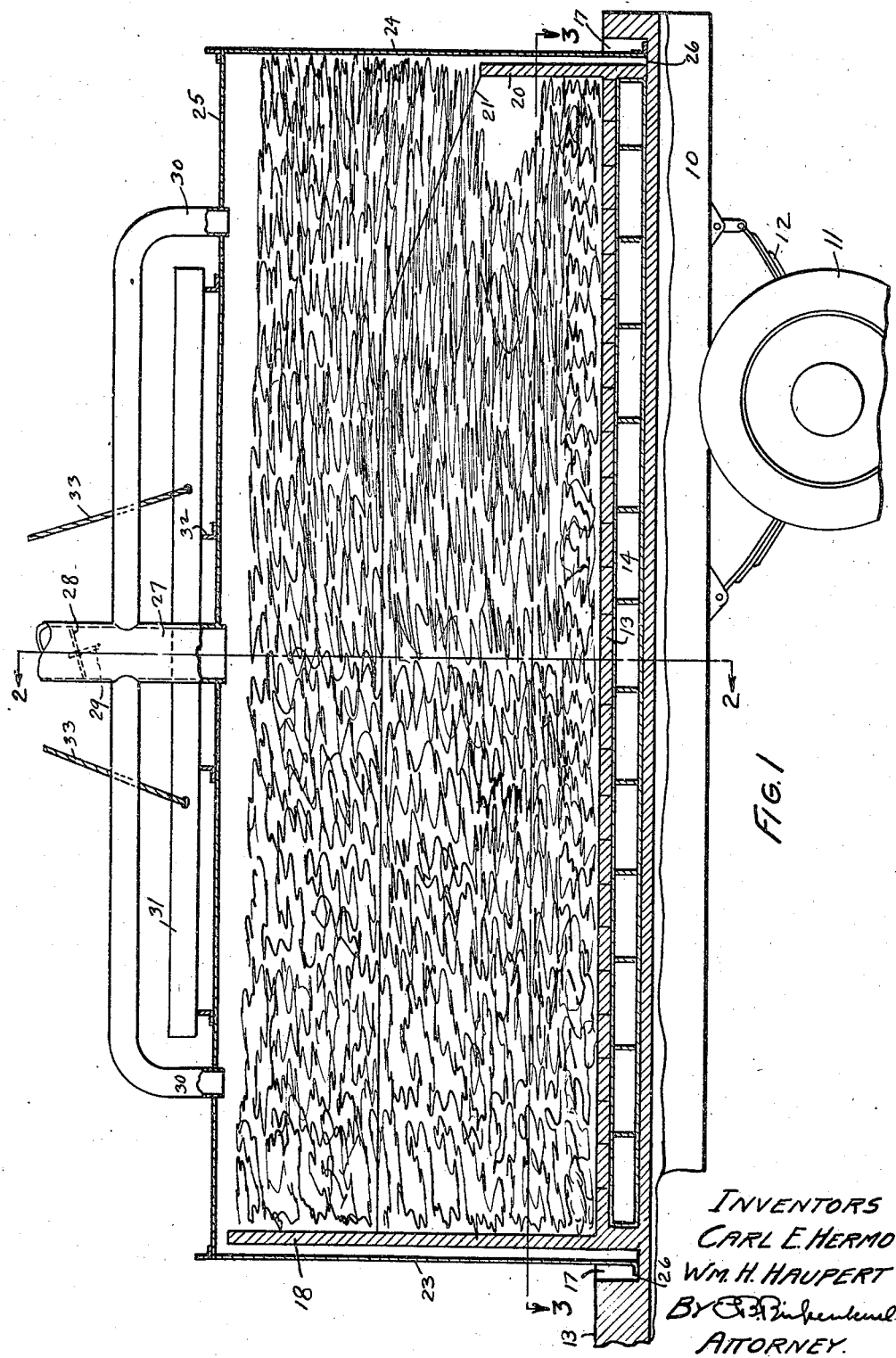
Fig. 1 is a vertical section through the apparatus.
Figure 2:
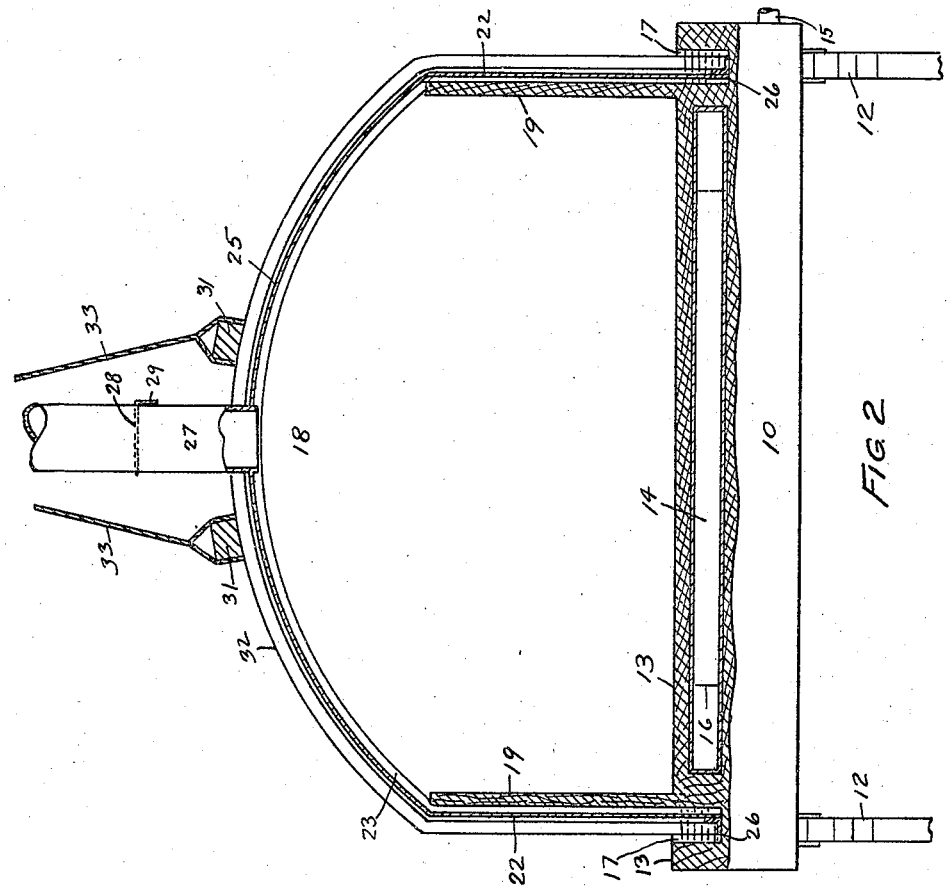
Fig. 2 is a vertical section taken along the line 2—2 in Fig. 1.
Figure 3:
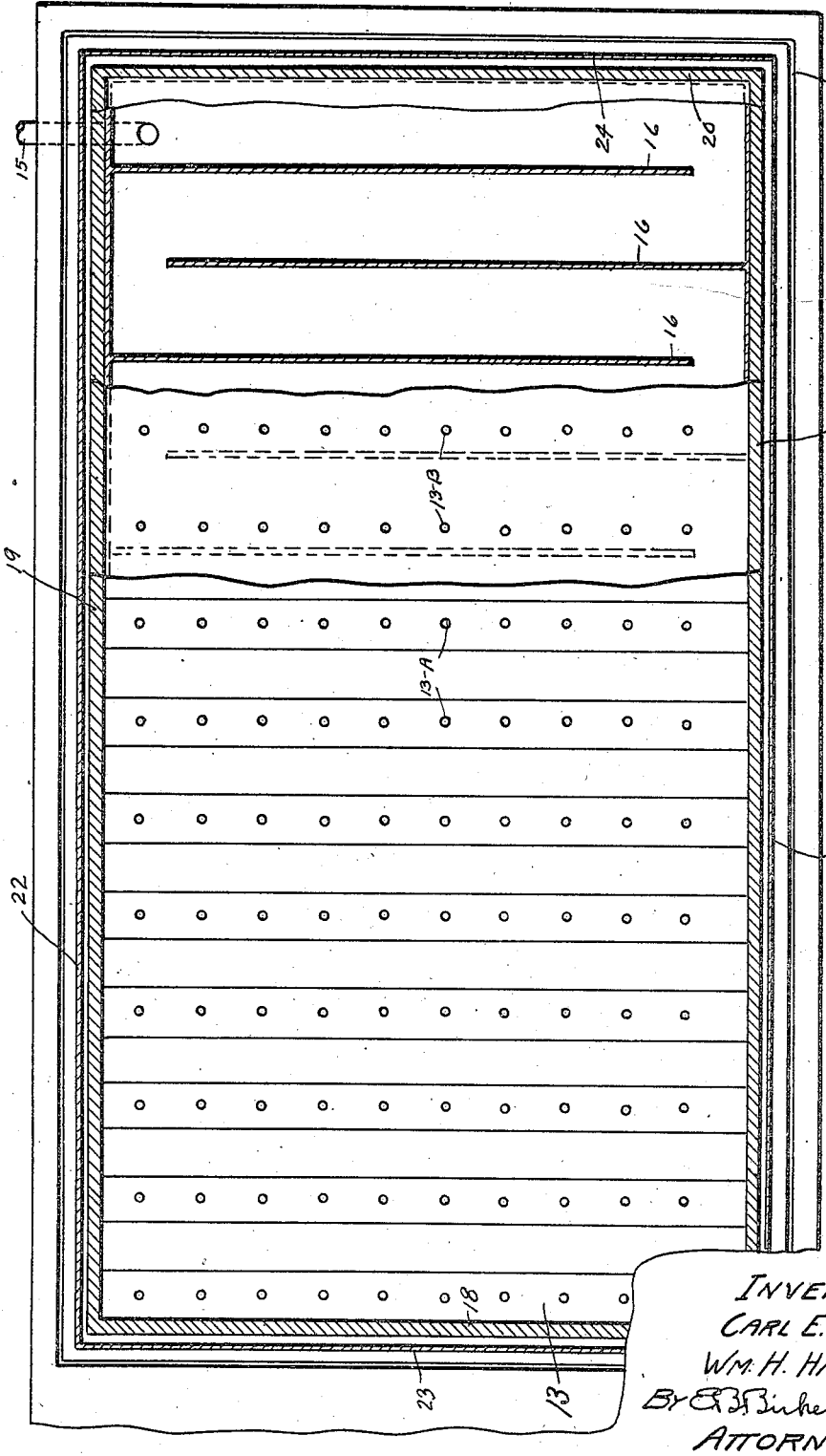
Fig. 3 is a horizontal section taken along the line 3—3 in Fig. 1.

Referring in detail to the drawing, there is shown the chassis 10 of a land traveling vehicle (preferably motorized) whose wheels 11 are connected to the chassis 10 by means of the springs 12. Across the chassis 10 is a deck 13, the boards of which are loosely fitted and perforated with holes 13—a to permit the passage of steam therethrough. Under the deck 13 is a steam chest 14 to which steam is admitted during the processing by means of the pipe 15 which is coupled to a convenient source of supply at the processing point. Baffles 16 causes the steam to travel across the entire area of the deck 13. The top of the chest 14 is provided with perforations 13—b which registers with the holes 13—a.

Around the deck 13 is formed a moat 17 which is kept filled with water. At the forward end of the deck 13 is formed a head board 18, and along the sides of the deck 13 are formed a somewhat lower side wall 19 which connects with a still lower rear wall 20 making an enclosed area into which the peppermint hay is piled by the loader in the field. It is to prevent an interference with this loader that the side walls 19 are cut away along the lines 21.

Associated with the vehicle, but independent thereof, is a hood or steam dome consisting of the side walls 22, the head end wall 23 and the rear end wall 24, all of which merge into and are hermetically sealed to the arched top 25. The lower edges of the sides 22, 23, and 24, are free on the bottom 26 of the moat 17. Communicating with the interior of the hood and extending through the top 25 is the main exhaust pipe 27 preferably provided with a damper 28 under the control of a hand lever 29. The exhaust pipe 27 normally connects with the still as does the usual vat commonly employed in peppermint operations.

The small outlet pipes 30 extend from the ends of the hood to the main outlet pipe 27 in order to more uniformly exhaust the vapors from the hood. A girder 31 is secured across the angle iron ribs 32 which reinforce the structure and the girder 31 affords a means by which the sling lines 33 may be attached to a convenient lifting boom (not shown).

In the description of this apparatus no attempt is made to show all of the details of construction since these may obviously be varied materially without departing from the spirit of the invention. The underlying thought being the processing of the hay on the rack without disturbing it, making it unnecessary to handle the hay after it has been placed on the rack by the loader until it is desired to unload it from the rack on to the field where it is used as a fertilizer. That is eliminating the moving of the hay from the rack into the vat and the pressing of the hay within the vat by manpower and finally the removal of the processed hay from the vat on to the rack.

We claim:

In an apparatus of the class described, the combination of a land traveling vehicle having a flat deck provided with a water containing moat disposed around the periphery thereof, the inner edges of said moat having upright walls formed thereon and a dome removably placed over said vehicle in a manner to enclose said walls and having its lower edge extending into said moat, together with means for supplying steam to the underside of the vehicle deck and for exhausting volatiles from the top of said dome.

CARL E. HERMO.
WILLIAM H. HAUPERT.

REFERENCES CITED

The following references are of record in the file of this patent:

UNITED STATES PATENTS

| Number | Name | Date |
|---|---|---|
| 742,351 | Pittman | Oct. 27, 1903 |
| 802,882 | Piver | Oct. 24, 1905 |
| 878,785 | Dungan | Feb. 11, 1908 |
| 786,144 | Palmer | Mar. 28, 1905 |
| 1,190,006 | Ralliff | July 4, 1916 |
| 1,496,392 | Todd | June 3, 1924 |
| 1,373,702 | Barr | Apr. 5, 1921 |
| Re. 3,612 | Van Marter | Aug. 17, 1869 |

FOREIGN PATENTS

| Number | Country | Date |
|---|---|---|
| 248,582 | Italy | May 22, 1926 |